(12) United States Patent
Fahrig

(10) Patent No.: US 9,081,621 B2
(45) Date of Patent: Jul. 14, 2015

(54) EFFICIENT INPUT/OUTPUT-AWARE MULTI-PROCESSOR VIRTUAL MACHINE SCHEDULING

(75) Inventor: Thomas Fahrig, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 669 days.

(21) Appl. No.: 12/626,320

(22) Filed: Nov. 25, 2009

(65) Prior Publication Data

US 2011/0126203 A1 May 26, 2011

(51) Int. Cl.
*G06F 9/455* (2006.01)
*G06F 9/50* (2006.01)

(52) U.S. Cl.
CPC .......... *G06F 9/5077* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 4,855,899 A | 8/1989 | Presant | |
| 6,075,938 A | 6/2000 | Bugnion | |
| 6,370,560 B1* | 4/2002 | Robertazzi et al. | 718/105 |
| 2003/0061264 A1* | 3/2003 | Benhase et al. | 709/105 |
| 2007/0028244 A1* | 2/2007 | Landis et al. | 718/108 |
| 2009/0007108 A1 | 1/2009 | Hanebutte | |
| 2009/0089470 A1* | 4/2009 | Ven | 710/260 |

OTHER PUBLICATIONS

Towards Scalable and High Performance I/O Virtualization—A Case Study Jinpeng Wei, Jeffrey R. Jackson, and John A. Wiegert Published: 2007.*

Communication-aware CPU Management for Consolidated Virtualization-based Hosting Platforms Sriram Govindan, Arjun R. Nath, Amitayu Das Published Oct. 17, 2006.*

XenMon: QoS Monitoring and Performance Profiling Tool Diwaker Gupta, Rob Gardner, Ludmila Cherkasova Published Oct. 18, 2005.*

Software Techniques to Improve Virtualized I/O Performance on Multi-Core Systems Guangdeng Liao, Danhua Guo, Laxmi Bhuyan, Steve R King Published Nov. 7, 2008.*

Uhlig, Volkmar, et al., "Towards Scalable Multiprocessor Virtual Machines", Published May 6-7, 2004, 14 pages, System Architecture Group, Universitat Karlsruhe, http://l4ka.org/publications/2004/Towards-Scalable-Multiprocessor-Virtual-Machines-VM04.pdf.

(Continued)

*Primary Examiner* — Emerson Puente
*Assistant Examiner* — Paul Mills
(74) *Attorney, Agent, or Firm* — Bryan Webster; Kate Drakos; Micky Minhas

(57) ABSTRACT

Computerized methods, computer systems, and computer-readable media for governing how virtual processors are scheduled to particular logical processors are provided. A scheduler is employed to balance a CPU-intensive workload imposed by virtual machines, each having a plurality of virtual processors supported by a root partition, across various logical processors that are running threads and input/output (I/O) operations in parallel. Upon measuring a frequency of the I/O operations performed by a logical processor that is mapped to the root partition, a hardware-interrupt rate is calculated as a function of the frequency. The hardware-interrupt rate is compared against a predetermined threshold rate to determine a level of an I/O-intensive workload being presently carried out by the logical processor. When the hardware-interrupt rate surpasses the predetermined threshold rate, the scheduler refrains from allocating time slices on the logical processor to the virtual machines.

17 Claims, 8 Drawing Sheets

(56) References Cited

OTHER PUBLICATIONS

Gavrilovska, Ada, et al., "High-Performance Hypervisor Architectures: Virtualization in HPC Systems", Published Mar. 20, 2007, 8 pages, Center for Experimental Research in Computer Systems, Georgia Institute of Technology, Atlanta, Georgia, http://www.csm.ornl.gov/srt/hpcvirt07/papers/paper10.pdf.

Weng, Chuliang, et al., "The Hybrid Scheduling Framework for Virtual Machine Systems", Published 2009, 10 pages, Department of Computer Science and Engineering, Shanghai Jiao Tong University, China, http://delivery.acm.org/10.1145/1510000/1508309/p111-wengpdf?key1=1508309&key2=4529691521&coll=GUIDE&dl=GUIDE&CFID=51174916&CFTOKEN=79318192.

Ongaro, Diego, et al., "Scheduling I/O in Virtual Machine Monitors", Published Mar. 5-7, 2008, 10 pages, Rice University, Houston, Texas, http://www.cs.rice.edu/CS/Architecture/docs/ongaro-vee08.pdf.

Arunkundram, Rajiv, "An Introduction to Hyper-V in Windows Server 2008" Retrieved Sep. 2, 2009, 8 pages, http://www.diraction.ch/shopdocs/filesNirtualization2.pdf.

* cited by examiner

EFFICIENT INPUT/OUTPUT-AWARE MULTI-PROCESSOR VIRTUAL MACHINE SCHEDULING

BACKGROUND

Large-scale networked systems are commonplace platforms employed in a variety of settings for running applications and maintaining data for business and operational functions. For instance, a data center (e.g., physical cloud computing infrastructure) may provide a variety of services (e.g., web applications, email services, search engine services, etc.) for a plurality of customers simultaneously. These large-scale networked systems typically include a large number of resources distributed throughout the data center, in which each resource resembles physical machines or virtual machines running as guests on a physical host.

When the data center hosts multiple guests (e.g., virtual machines), these resources are scheduled to logical processors within the physical machines of a data center for varying durations of time. Also, hosting multiple guests involves putting in place a root partition to facilitate the guests' access to network packets and other resources residing on the physical machines, such as hard disks. Often, mechanisms are utilized by operating system kernels to carry out the scheduling of the guests, as well as to synchronize data structures (e.g., logical processors) within the physical machines. These mechanisms typically attempt to distribute requests from the guests across all available logical processors—particularly within multi-threaded environments. For instance, in the context of multi-threaded environments, the mechanisms schedule the requests issued by multiple virtual processors (comprising the virtual machines) to be executed on multiple logical processors simultaneously.

This procedure for utilizing any available logical processors without further analysis regularly potentially causes input/output (I/O) operations issued by the root partition to be de-scheduled or blocked. This delay in executing the I/O operations that results from de-scheduling or blocking creates inefficiencies within the multithreaded environment. For example, the delay in executing the I/O operations creates latency in carrying out tasks requested by the guests, promotes under-utilization of the physical machines within the data center, and sometimes can significantly reduce throughput with respect to the virtual machines.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide mechanisms, within a multithreaded environment, that implement a scheme that detects logical processors that are designated for input/output (I/O) processing and uses this information to more efficiently schedule ready virtual processors onto the available logical processors. In embodiments, this scheme is implemented by the scheduler to exclude logical processors under certain conditions. For instance, upon the scheduler identifying that a particular logical processor is designated as being dedicated for executing I/O operations issued from a root partition and, upon the scheduler identifying that certain conditions have occurred, the scheduler opportunistically excludes one or more virtual processors from being scheduled to the dedicated logical processor.

In one embodiment, these mechanisms, such as the scheduler, are configured to determine whether an I/O-intensive workload being executed by the dedicated logical processor has reached a significant level. For instance, the scheduler may track a frequency at with the root partition is asking the dedicated logical processor to perform I/O operations issued thereby. In an exemplary embodiment, a hardware-interrupt rate may be derived as a function of, or based upon, the tracked frequency. Periodically, the hardware-interrupt rate is compared against a predetermined threshold rate (e.g., 2000 interrupts per second). If the hardware-interrupt rate surpasses the predetermined threshold rate, the virtual processors (comprising a virtual machine that is supported by the root partition) are excluded from being scheduled to the dedicated logical processor. In other words, the root partition is awarded the top priority to use the dedicated logical processor in the event that the dedicated logical processor is being inundated with high I/O-intensive workload.

Otherwise, the virtual processors can be scheduled to the dedicated logical processor based on a set of policies carried out by the scheduler. For instance, the set of policies may dictate that a certain number or percentage of time slices on the dedicated logical processor may be allocated to the virtual machines within a particular timeframe. Accordingly, latency generated by de-scheduling or blocking the root partition from the dedicated root partition is reduced in periods of high I/O-intensive workload, while a CPU-intensive workload imposed by the virtual processors is balanced across available resources in periods when the I/O-intensive workload is comparatively low.

BRIEF DESCRIPTION OF THE DRAWINGS

Embodiments of the present invention are described in detail below with reference to the attached drawing figures, wherein.

DETAILED DESCRIPTION

Figure 1:
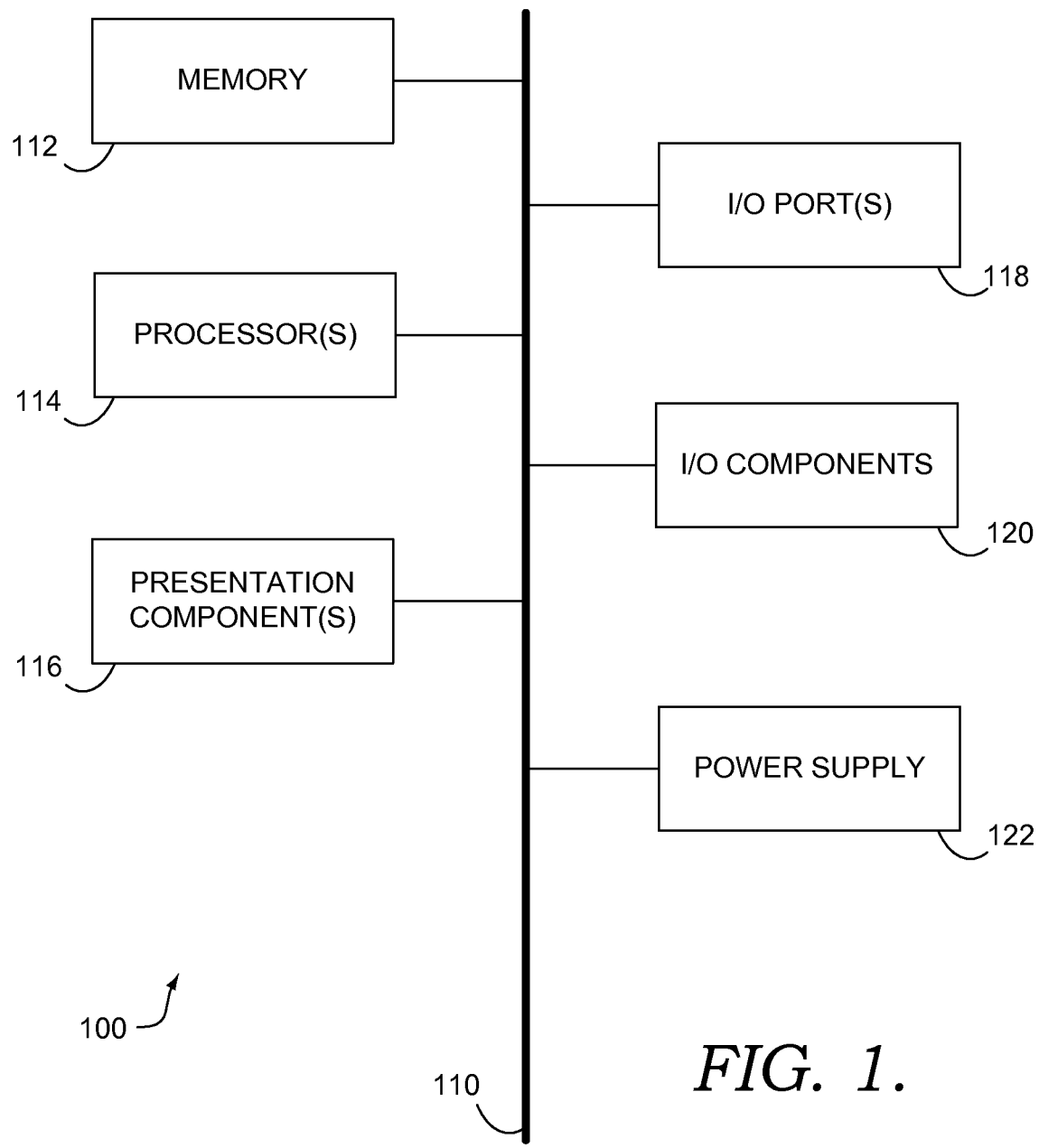
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, computer systems, and computer-readable media for determining whether a logical processor that is mapped to a root partition is executing a high amount of input/output (I/O) operations issued from the root partition and, if so, opportunistically excluding virtual processors from being scheduled to the logical processor. In one aspect, embodiments of the present invention relate to one or more computer-readable media having computer-executable instructions embodied thereon that, when executed, perform a method for excluding one or more virtual processors from being scheduled to a logical processor. The method involves the step of monitoring over a window of time the pattern of I/O operations performed by a root partition. Typically, the root partition's virtual processor is mapped to the logical processor, which is designated to carry out I/O operations issued by the root partition. The method may further include the steps of deriving an I/O-awareness variable as a function of the pattern of I/O operations and, based on the I/O-awareness variable, refraining from scheduling tasks issued from the virtual processors onto the logical processor.

In embodiments, the "I/O-awareness variable" indicates an amount of I/O processing currently occurring at a logical processor, the conditions affecting the efficiency of the virtual processors, or the level of activity the root partition is presently exhibiting. By way of example, the I/O-awareness variable may be described in terms of a hardware-interrupt rate, a value of the waiting times that occur between issuing and executing a thread, or a measure of an amount of intercepting instructions being communicated. In the instance that the I/O-awareness variable is described as the hardware-interrupt rate, the hardware-interrupt rate may be updated locally for each logical processor in order to conserve resources and to make the hardware-interrupt rate accessible by a scheduler with very low cost.

In another aspect, embodiments of the present invention relate to a computer system for disallowing a plurality of logical processors from being scheduled to a particular logical processor as a function of root-partition usage thereof. Initially, the computer system includes a first node, a second node, and a scheduler. The first node resides on a physical machine and is associated with a plurality of logical processors. Typically, one of the plurality of logical processors is mapped to a root partition. The scheduler runs on the physical machine. Further, the scheduler is configured to perform one or more of the following processes: observing a frequency at which the mapped logical processor executes I/O operations issued by the root partition; refraining from granting a time slice on the mapped logical processor to the virtual processors when the observed frequency reaches a predefined level; and recording in an interrupt table an indication to exclude the mapped logical processor from consideration when scheduling the virtual processors to the plurality of logical processors.

The second node resides on the physical machine and is associated with a plurality of logical processors that are segregated from the plurality of logical processors associated with the first node. Typically, one of the plurality of logical processors associated with the second node is mapped to the root partition. In embodiments, a first virtual machine includes a first portion of the plurality of virtual processors and a second virtual machine includes a second portion of the plurality of virtual processors. In operation, the root partition issues the I/O operations to provide the first virtual machine with access to network packets and hardware memory, and issues the I/O operations to provide the second virtual machine with access to network packets and hardware memory.

In yet another aspect, embodiments of the present invention relate to a computerized method for arresting allocation of a logical processor to one or more virtual processors. The method includes the step of identifying a frequency at which a root partition has acquired a lock on the logical processor. Typically, the logical processor is one of a plurality of logical processors that are carved out of a physical machine to execute threads issued by the virtual processors. In operation, the logical processor is configured to execute I/O operations issued by the root partition upon acquiring the lock.

The method further includes ascertaining a hardware-interrupt rate as a function of the identified frequency, and comparing the hardware-interrupt rate against a predetermined threshold rate. When the hardware-interrupt rate surpasses the predetermined threshold rate, the allocation of the logical processor to the virtual processors is arrested. However, when the hardware-interrupt rate resides below the predetermined threshold rate, the virtual processors may be scheduled to the logical processor.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O)

ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
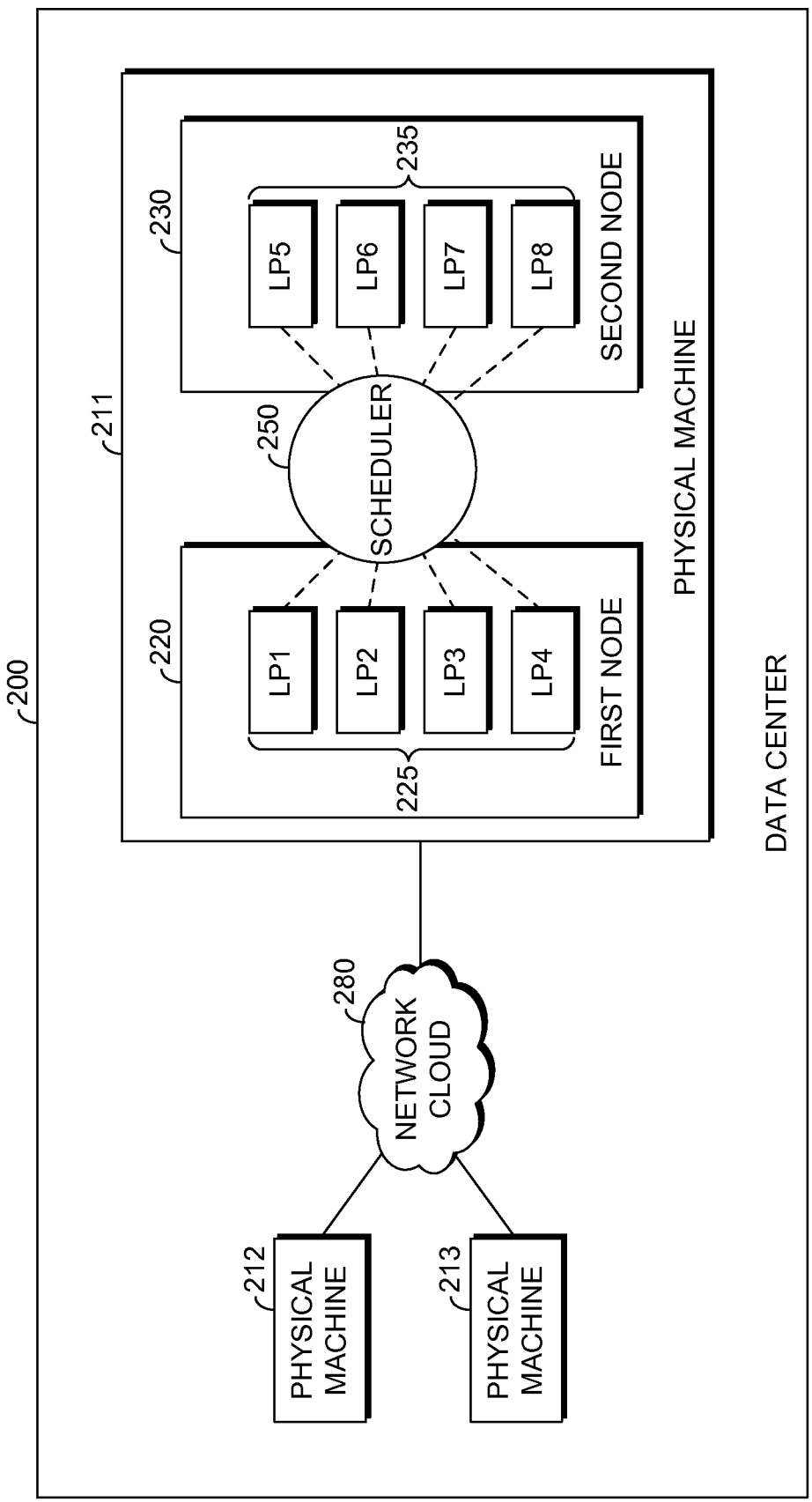
FIG. 2 is a block diagram illustrating an exemplary cloud computing platform, suitable for use in implementing embodiments of the present invention, that is configured to allocate virtual machines within a data center.

Turning now to FIG. 2, a block diagram is illustrated, in accordance with an embodiment of the present invention, showing an exemplary cloud computing platform that is configured to allocate physical machines 211, 212, and 213 within a data center 200 for use by one or more virtual machines. It will be understood and appreciated that the cloud computing platform shown in FIG. 2 is merely an example of one suitable computing system environment and is not intended to suggest any limitation as to the scope of use or functionality of embodiments of the present invention. Neither should the cloud computing platform 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy.

The cloud computing platform includes the data center 200 that is comprised of interconnected physical machines 211, 212, and 213, which are configured to host and support operation of virtual machines. In particular, the physical machines 211, 212, and 213 may include one or more nodes that have logical processors for running operations, tasks, or threads issued by the logical machines. These nodes may be partitioned within hardware of the physical machines 211, 212, and 213 in order to isolate applications or program components running thereon. However, the nodes may be connected across the hardware of a physical machine via hubs (not shown) that allow for a task, command, or thread (i.e., issued by an application or program component) being executed on a remote node to access memory at another node that is local to the application or the program component. The phrase "application," as used herein, broadly refers to any software, service application, or portions of software, that runs on top of, or accesses storage locations within, the data center 200.

By way of example, the physical machine 211 could possibly be equipped with two individual nodes, a first node 220 and a second node 230. However, it should be understood that other configurations of the physical machine 211 are contemplated (i.e., equipped with any number of nodes). The first node 220 and the second node 230 each include separate resources in the physical machine 211, but can communicate via a hub (not shown) to access remote memory. Often this type of a communication involves consuming significant resources and, thus, is more expensive than running the processes in isolation on the respective first node 220 and second node 230. Further, the first node 220 and the second node 230 may be provisioned with physical processors. For instance, the first node 220 may be provisioned with a set of physical processors 225 that includes logical processors LP1, LP2, LP3, and LP4. Similarly, the second node 230 may include a set of physical processors 235 that includes logical processors LP5, LP6, LP7, and LP8. In this embodiment, both the nodes 225 and 235 resemble multicore, or QuadCore, processors that are constructed with multiple physical cores (e.g., LP1-LP8) for processing threads in parallel. Although specific configurations of nodes are depicted, it should be appreciated and understood that threads, tasks, and commands from the virtual machines may be executed by various processing devices which are different in configuration from the specific illustrated embodiments above. For instance, any number of logical processors, working in conjunction with other resources (e.g., software and/or hardware), can be used to carry out operations assigned to the nodes 225 and 235. Therefore it is emphasized that embodiments of the present invention are not limited only to the configurations shown and described, but embrace a wide variety of computing device designs that fall within the spirit of the claims.

Typically, the logical processors LP1-LP8 represent some form of a computing unit (e.g., central processing unit, microprocessor, blades of a server, etc.) to support operations of the virtual machines running thereon. As utilized herein, the phrase "computing unit" generally refers to a dedicated computing device with processing power and storage memory, which supports one or more operating systems or other underlying software. In one instance, the computing unit is configured with tangible hardware elements, or machines, that are integral, or operably coupled, to the nodes 220 and 230, or the physical machines 211, 212, and 213, within the data center 200 to enable each device to perform a variety of processes and operations. In another instance, the computing unit may encompass a processor coupled to a computer-readable medium accommodated by the nodes 220 and 230. Generally, the computer-readable medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Per embodiments of the present invention, the physical machines 211, 212, and 213 represent any form of computing devices, such as a personal computer, a desktop computer, a laptop computer, a mobile device, a consumer electronic device, server(s), blades in a stack, the computing device 100 of FIG. 1, and the like. In one instance, the physical machines 211, 212, and 213 host and support the operations of the virtual machines assigned thereto, while simultaneously hosting other virtual machines, or guests, created for supporting other customers of the data center 200. In operation, these guests support service applications owned by those customers.

In one aspect, the nodes 220 and 230 operate within the context of the cloud computing platform and, accordingly, communicate internally through connections dynamically made between the physical machines 211, 212, and 213, and externally through a physical network topology to other resources, such as a remote network (e.g., enterprise private network). The connections may involve interconnecting via a network cloud 280. The network cloud 280 interconnects these resources such that the node 220 may recognize a location of the node 230, and other nodes, in order to establish communication pathways therebetween. In addition, the network cloud 280 may establish this communication over channels connecting the nodes 220 and 230. By way of example, the channels may include, without limitation, one or more local area networks (LANs) and/or wide area networks (WANs). Such networking environments are commonplace in offices, enterprise-wide computer networks, intranets, and the Internet. Accordingly, the network is not further described herein.

Figure 3:
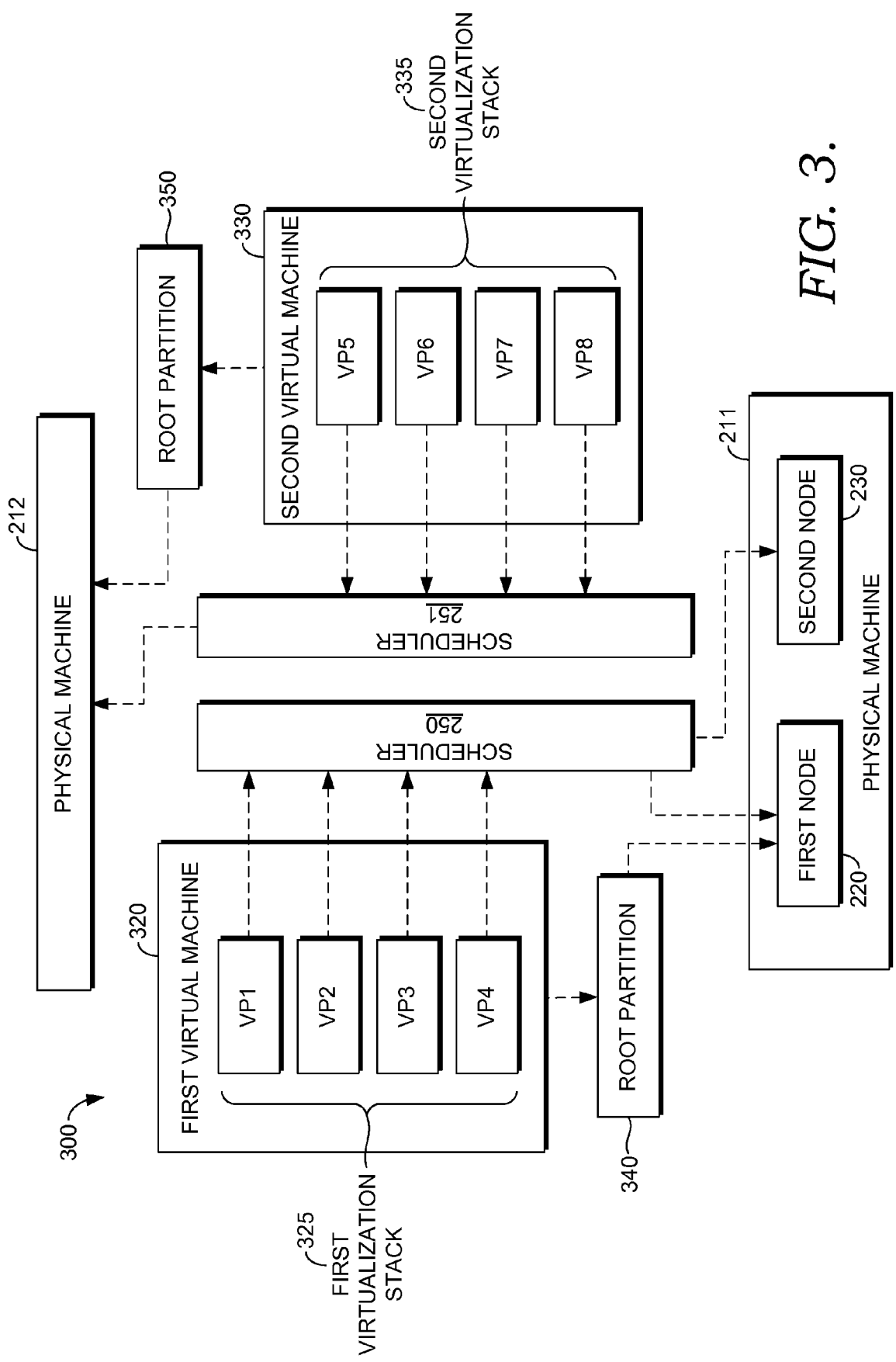
FIG. 3 is block diagram of an exemplary distributed multithread environment illustrating virtual machines overlaid on physical machines via a scheduler, in accordance with an embodiment of the present invention.

Turning now to FIG. 3, a block diagram is illustrated that shows an exemplary distributed multithread environment 300 depicting virtual machines 320 and 330 overlaid on physical machines, such as the physical machine 211, via schedulers 250 and 251, in accordance with an embodiment of the present invention. In one embodiment, the virtual machines 320 and 330 may represent the portions of software and hardware that participate in running a service application. The virtual machines 320 and 330 are typically maintained by a virtualization layer, such as the respective schedulers 250 and 251, that virtualizes hardware, such as the first node 220 and second node 230, for executing commands, tasks, and threads. In one example, the first virtual machine 320 includes a first virtualization stack 325 of virtual processors (VP1, VP2, VP3, and VP4) that is associated with the scheduler 250. In this example, the second virtual machine 330 includes a second virtualization stack 335 of virtual processors (VP5, VP6, VP7, and VP8) that is associated with the scheduler 251. In this example, the scheduler 250 is configured to schedule threads (illustrated as dashed lines), issued by the virtual processors VP1-VP4, to the logical processors provisioned within the first node 220 and the second node 230, respectively. The scheduler 251 is configured to schedule threads (illustrated as dashed lines), issued by the virtual processors VP5-VP8, to the logical processors provisioned within another instance of the physical machine 212, as discussed above with reference to FIG. 2.

By way of example, the scheduler 250 allocates time slices on the logical processors to execute threads, such that the logical processors can support a multitude of threads issued from the virtual processors VP1-VP4 plus other virtual processors (not shown) in tandem. In an exemplary embodiment, the scheduler 250 allocates time slices for VP1-VPX, where X is greater than four (i.e., hosting many virtual processors on fewer logical processors). In this situation, the number of virtual processors outnumber a number of logical processors so there is not a one-to-one correlation therebetween, thus, the scheduler 250 is configured to dynamically manage usage of logical processors to balance a changing load imposed by many virtual processors. As used herein, the phrase "time slice" is not meant to be limiting, but may encompass a share of computing resources (e.g., CPU and/or memory) that is granted to a virtual processor to execute a thread, or some other work issued by the virtual processor.

Generally, the virtual processors VP1-VPX of the virtual machine 320 are allocated on one or more logical processors to support functionality of a service application, where allocation is based on demands (e.g., amount of processing load) applied by the service application. As used herein, the phrase "virtual machine" is not meant to be limiting and may refer to any software, application, operating system, or program that is executed by a logical processor to enable the functionality of a service application running in a data center. Further, the virtual machines 320 and 330 may access processing capacity, storage locations, and other assets within the data center to properly support the service application.

In operation, the virtual processors VP1-VPX comprising the virtual machine 320 are dynamically scheduled to resources (e.g., logical processors LP1-LP4 of FIG. 2) within a physical computer system inside the data center. In a particular instance, threads issued from the virtual processors are dynamically awarded time slices on logical processors to satisfy a current processing load. In embodiments, a scheduler 250 is responsible for automatically allocating time slices on the logical processors. By way of example, the scheduler 250 may rely on a service model (e.g., designed by a customer that owns the service application) to provide guidance on how and when to allocate time slices on the logical processors.

As used herein, the term "scheduler" is not meant to be limiting, but may refer to any logic, heuristics, or rules that are responsible for scheduling the virtual processors VP1-VPX, or any other virtual processors, on available logical processors. In an exemplary embodiment, the scheduler 250 attempts to select the optimal, or best suited, logical processor to accept and execute a particular virtual processor. Upon selection, the scheduler 250 may proceed to allocate a time slice on the optimal logical processor and to place the thread thereon. These decisions (e.g., selection, allocation, and scheduling) performed by the scheduler 250 are imperative to the proper and timely performance of a service application. Further, it is advantageous to use efficient algorithms when making the decisions.

In embodiments, the schedulers 250 and/or 251 represent local schedulers that are running on each instance of a physical machine individually. As illustrated, the scheduler 250 is running on the physical machine 211, while the scheduler 251 is running on the physical machine 212. Accordingly, the schedulers 250 and 251 illustrated in FIG. 3 manage workload within a particular physical machine, where such physical machines include a scheduler (hypervisor), a single root partition, and one virtualization stack. The physical machines 211 and 212 make up a portion of the data center which is configured to host the virtual machines.

As more fully discussed below, the embodiments of the present invention relate to opportunistically scheduling threads, thereby reducing spin waits. By way of example, the scheduler 250 may include a hypervisor. In operation, the hypervisor manages CPUs and memory in the physical machine 211 and is responsible for multiplexing the logical processors onto many virtual processors. The hypervisor manages virtual processors belonging to virtual machines hosted within the data center and provide optimal performance characteristics for guests (e.g., virtual machines 320 and 330) that run on top of the logical processors.

In a particular instance, the hypervisor is charged with scheduling logical processors in a way that maintains a parity (of access to the logical processors) among the virtual processors VP1-VPX, thus promoting fairness within the system. This type of a scheduling may involve implementing a selection scheme that attempts to evenly distribute the allocated time slices of the logical processors between the virtual processors VP1-VPX, while still opportunistically granting extended time slices to particular virtual processors when certain conditions are detected (e.g., executing a critical section of code). Thus, via the methods discussed below, the hypervisor can mitigate front-end inefficiencies caused by unenlightened de-scheduling of the virtual machines and can mitigate back-end inefficiencies by preemptively de-scheduling those virtual machines having issued threads presently in a spin-wait state. In other embodiments, the hypervisor looks at a priority of a virtual processor, an amount of time awarded the virtual processor with respect to time awarded to other virtual processors, and/or other criteria when deciding how to schedule the logical processors to the virtual processors VP1-VPX.

It will be understood and appreciated that the hypervisor included within the scheduler 250 shown in FIG. 3 is merely an example of suitable logic to support the service application and is not intended to suggest any limitation as to the scope of use or functionality of embodiments of the present invention.

Each of the virtual machines 320 and 330 may be associated with one or more virtual processors configured as root partitions. Typically, one virtual machine is associated with a single root partition, as illustrated in FIG. 3. As further illustrated in FIG. 3, the first virtual machine 320 is associated with a root partition 340 while the second virtual machine 330 is associated with a root partition 350. As described herein, the root partitions 340 and 350 generally pertain to mechanisms that support the input/output activity of the other virtual processors VP1-VPX of the virtual machines 320 and 330. In this role, the root partitions 340 and 350 allow for communication between the virtual machines 320 and 330 and may be responsible for networking with many other virtual machines (e.g., via a direct access to the network) by leveraging a network card, disk, or other hardware. In one instance of operation, the root partitions 340 and 350 are configured to generate a request at local virtual machines 320 and 330, respectively, via a dedicated channel in the hardware, and to convey the request to remote virtual machines, thereby enforcing security and isolation of the virtual machines.

In an exemplary embodiment, the first node 220 and the second node 230 form a computer system that, when managed by the scheduler 250, is capable of reducing runtime of a thread being executed at one node (e.g., second node 230) that is remotely located from memory on another node (e.g., first node 220) being utilized by a virtual processor. Generally, if a virtual processor within either virtualization stack 325 or 335 occupies memory (not shown) in the first node 220, this memory is local to the logical processor of the first node 220. The presence of local memory enables efficient execution of a thread issued from the virtual processor when the thread is scheduled to the logical processors of the first node 220. In contrast, when the thread issued by the virtual processor is scheduled to a remote logical processor on the second node 230, any access to the memory on the first node 220 is inefficient because communication is conducted via a hub, which connects the first node 220 and the second node 230 across a hardware partition. This is true even in the situation where the first node 220 and the second node 230 are carved out of resources of the same physical machine 211.

Accordingly, embodiments of the present invention address this inefficiency by configuring the scheduler 250 to allocate longer time slices on local logical processors residing on the first node 220, where the virtual processor is associated with memory in the first node 220, and to allocate shorter time slices on remote logical processors residing on the second node 230. In particular implementations of this allocation scheme, the scheduler 250 is initially configured to receive an indication that a virtual processor is attempting to execute a thread. The indication may be based on the operating system detecting one of the root partitions 340 or 350 is attempting to perform input/output work on behalf of other virtual machines, thus acting in a hosting capacity. Also, this indication may be provided by the operating system installed on the physical machine 211.

Upon receiving the indication, the scheduler 250 may initially ascertain whether one or more local logical processors in the first node 220 are available, where memory that is local to the virtual processor is included in the first node 220. If it is determined that the first node 220 lacks the available resources to execute the thread, the scheduler 250 may inspect the second node 320 to ascertain its present availability. If there exists a remote logical processor in the second node 230 that can execute the thread, that remote logical processor is scheduled to execute the thread. As such, even though this remote logical processor will likely not execute the thread as efficiently as the local logical processor, the scheduler prioritizes fulfilling requests from the virtual processors in a timely manner over waiting for the most-efficient resources to become available.

However, because the remote logical processor is not as efficient as the local logical processor, the scheduler 250 may allocate a reduced time slice on the remote logical processor in the second node 230. In an exemplary embodiment, the duration of time associated with the reduced time slice is less than a duration of time associated with a pre-established time slice generally allocated on the local logical processors in the first node 220. By way of example, the reduced time slice may be associated with a duration of time lasting 100 microseconds (μs), while the pre-established time slice may be associated with a duration of time lasting 10 milliseconds (ms). In this way, the scheduler can make opportunistic time slice adjustments for threads running on remote logical processors in nonideal nodes, such as the second node 230 in this example. This technique employed by the scheduler 250 for decreasing time slices on nonideal nodes, in comparison to time slices allocated on preferred nodes, can be applied to a nonuniform memory access (NUMA) topology to improve overall system performance.

By decreasing time slices on nonideal nodes, the scheduler 250 reduces runtime of a thread being executed on the remote logical processors. But, because root partitions 340 and 350 often exhibit bursty behavior, where a compact set of tasks are requested in a sporadic fashion, the reduced runtime is still generally adequate to satisfy the needs of the root partitions 340 and 350. If the runtime is not adequate (i.e., the reduced time slice scheduled on the remote logical processor in the nonideal node elapsed), the scheduler 250 can return to the preferred node (first node 220) to check for local-logical-processor availability. Accordingly, this sampling approach provides the scheduler 250 with opportunities to optimize the scheduling of the pending threads, such that threads are attended to in a reasonable time frame while inefficient scheduling is limited.

Figure 4:
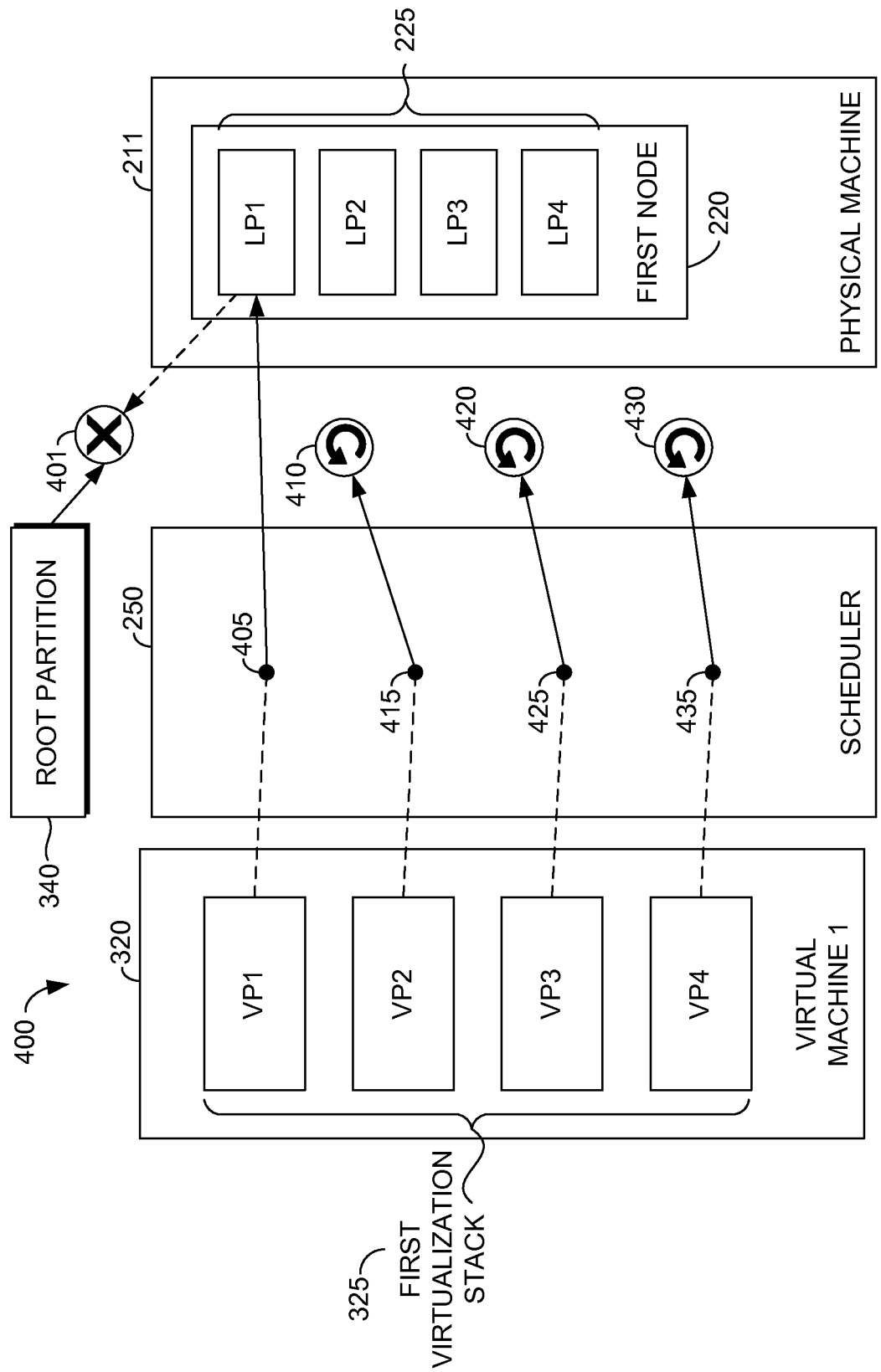
FIG. 4 is a block diagram of an exemplary distributed multithread environment where virtual processors are interacting with a physical machine via the scheduler, in accordance with an embodiment of the present invention.

Turning now to FIG. 4, a block diagram is shown that illustrates an exemplary distributed multithread environment 400 where the first virtualization stack 325 of virtual processors VP1-VP4 and the root partition 340 are interacting with logical processors 225 of the physical machine 211 via the scheduler 250, in accordance with an embodiment of the present invention. It should be appreciated and understood that this interaction illustrated in FIG. 4 is exemplary and intended to explain one embodiment of operation of the scheduler 250. Further, the operation of the scheduler 250 with respect to the root partition 340 is illustrated according to an embodiment of the present invention. In other embodiments, the scheduler 250 does not govern, or participate in, the scheduling or de-scheduling the root partition 340 to the logical processors 225 LP1-LP4 within the first node 220.

Initially, a thread 405 from virtual processor VP1 is identified by the scheduler 250. Upon identification, the scheduler 250 queries the logical processors 225 to find a logical processor that is available. In embodiments, availability is based, in part, on the scheduler 250 accessing an idle-summary table that enumerates the logical processors 225 in the first node 220 and their respective status as available or unavailable. In this exemplary interaction, the logical processor LP1 is found to be available to execute the thread 405 issued by VP1. Accordingly, the scheduler 250 allocates a time slice on LP1 such that LP1 can begin execution of the thread 405. However, when the logical processor LP1 is mapped to the root partition 340, a task issued by the root partition 340 is blocked upon allocating the time slice to VP1, even if other logical processors LP2-LP4 are available.

Generally, when the root partition 340 is mapped to the logical processor LP1, LP1 is the logical processor of the logical processors 225 that is designated as being available for executing the task 401 issued by the root partition 340. Because LP1 is the only logical processor mapped to the root partition 340 in the example, the root partition 340 utilizes time slices on LP1 to complete each task 401 requested thereby. As such, if the root partition 340 is de-scheduled from LP1, not scheduled to LP1, unable to acquire a lock on LP1, or unable to reach LP1 for any reason, the root partition 340 is forced to wait until LP1 is available and allocated to the root partition 340 to complete the task 401. As such, inefficiencies are generated when the root partition 340 is not granted immediate access to LP1, because the root partition 340 is not configured to request any of the other logical processors (LP2-LP4) to execute the task 410, even when one or more of LP2-LP4 is currently available.

As illustrated in this embodiment, reference numeral 410 depicts the de-scheduled task 401 waiting in queue to be rescheduled at LP1, where the thread 415 has acquired a lock. The threads 415, 425, and 435, issued from the virtual processors VP3 and VP4, respectively, are shown as residing in spin-wait states 410, 420, and 430. As discussed above, spin waits consume resources if left to cycle for an extended amount of time. Accordingly, it is advantageous to govern scheduling of the threads 405, 415, 425, and 435, in view of the task 401 from the root partition 340, in some cases, while restricting the threads 405, 415, 425, and 435 from being scheduled to the mapped LP1 in other cases, such as when the root partition 340 is using LP1 at a high level of frequency.

In another embodiment, the scheduler 250 may opportunistically create availability on LP1 by de-scheduling a thread issued from virtual processor or by de-scheduling a task 401 (e.g., I/O operation) being performed by the root partition 340, as shown in FIG. 4. This creation of availability may be in response to detecting that a thread was performing a spin wait for an extended number of consecutive cycles or that a time slice allocated to run the task 401 had expired. In this situation, the task 410 issued by the root partition 340 is stalled until the root partition 340 can be rescheduled to LP1 to complete the accompanying I/O operation. Often, the I/O operation is performed to support the functionality of one of the virtual processors VP1-VP4 from the first virtualization stack 325 that has targeted the root partition 340 to assist with accessing hardware. In this case, stalling the execution of the task 401 before completion will also cause a delay at the targeting virtual processor and create latency in the multithread environment 400.

Figure 5:
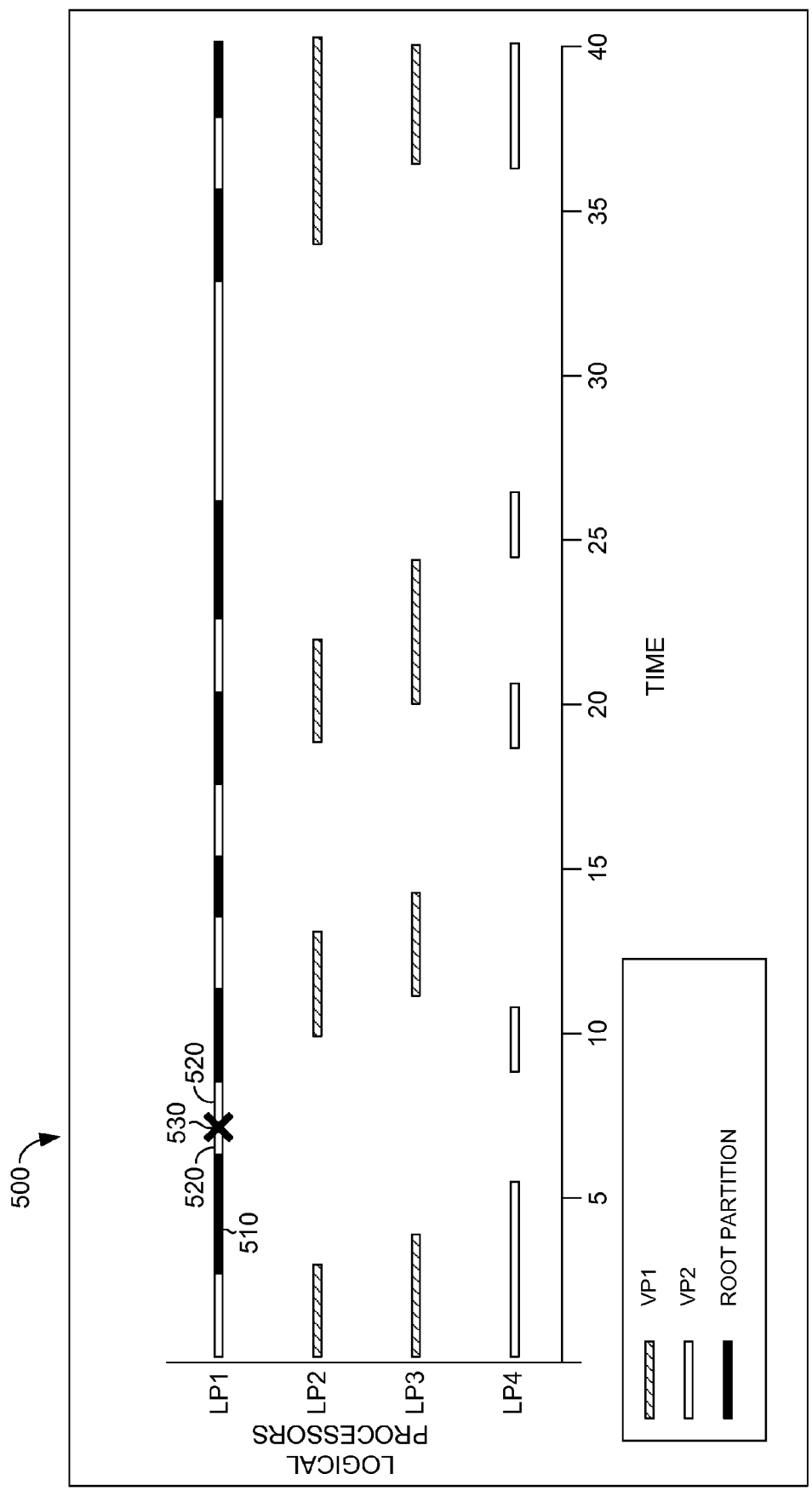
FIGS. 5 and 6 are schematic depictions of schemes for scheduling virtual processors to logical processors, in accordance with embodiments of the present invention.
Figure 6:
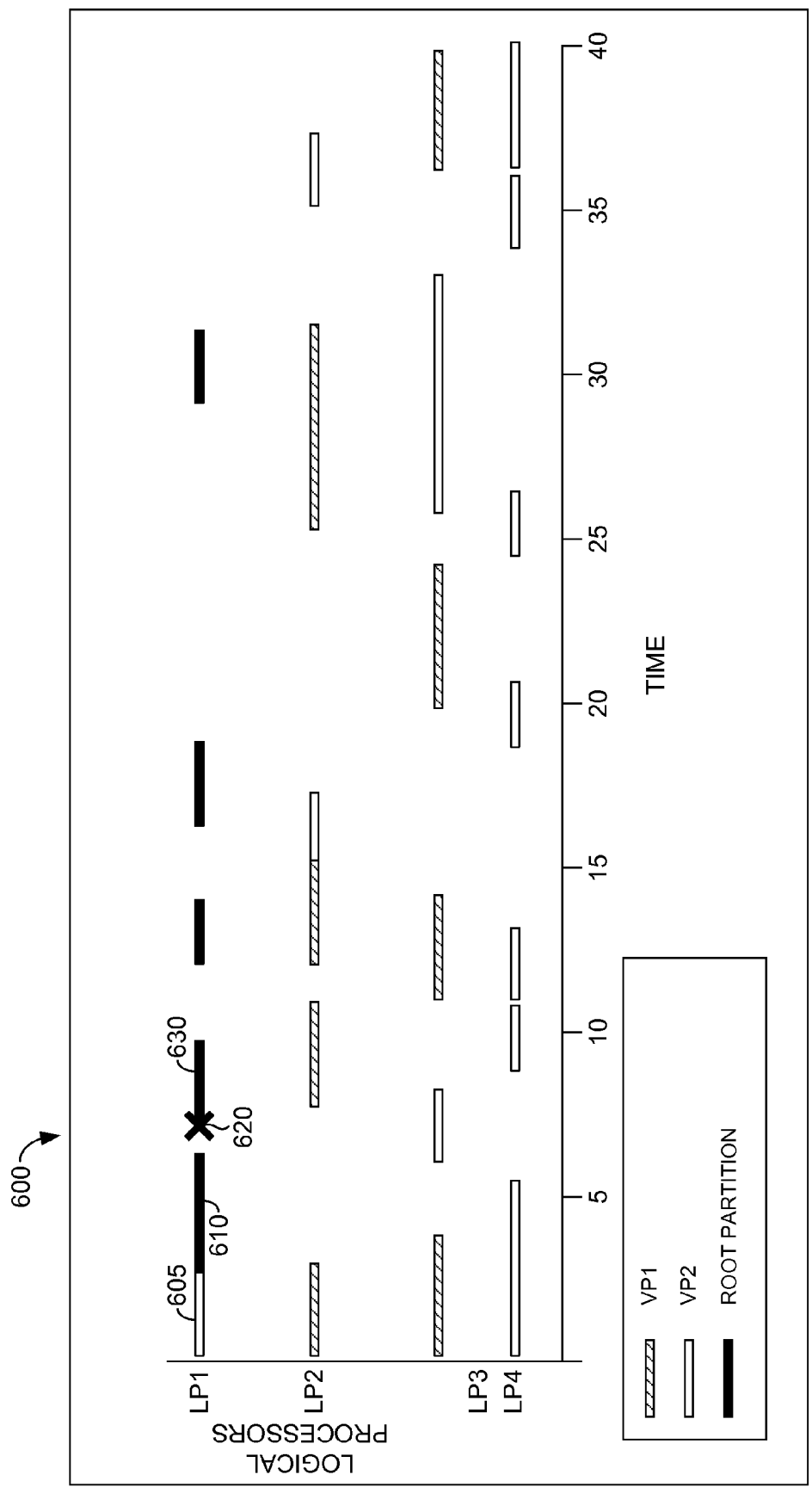

With reference to FIGS. 5 and 6, schematic depictions of schemes for scheduling virtual processors and a root partition to physical processors, are shown in accordance with embodiments of the present invention. Initially, the schemes are formatted as bar charts with four physical processors LP1, LP2, LP3, and LP4 represented on the y-axis while some period of time is represented on the x-axis. The hash marks on the x-axis are meant to depict a linear procession of time and not to indicate an actual duration of time slices that are allocated on the physical machines.

Referring to the schematic depiction of the scheme in FIG. 5, this scheme 500 demonstrates issues that may occur when a root partition has acquired a lock on logical processor LP1 and is de-scheduled therefrom. Initially, the root partition is mapped to LP1, where LP1 is the logical processor of the logical processors LP1-LP4 that can be allocated to perform tasks issued by the root partition. Accordingly, upon being requested by virtual processors—via I/O commands—to perform tasks that support opening network packets, reading physical memory, and the like, the root partition may be allocated a time slice 510 to execute an I/O operation.

However, before completing execution of the I/O operation, FIG. 5 illustrates the root partition being de-scheduled and VP2 being scheduled to LP1, and acquiring a lock thereto. In particular embodiments, a scheduler may allocate to VP2 a time slice 520 to execute a section of code associated with a thread. In one setting, the scheduler is configured to allow virtual processors to be scheduled to LP1. Scheduling may be prompted when LP1 is available, as indicated in the idle-summary table, or upon receiving a request from a virtual processor. This setting of the scheduler attempts to reduce spin waits and holds on processing threads by distributing processing work issued by virtual machines across all the logical processors, even when de-scheduling the root partition from its mapped logical processor (e.g., depicted by LP1 in FIG. 5) is likely. In another setting, the scheduler may allocate virtual processors to the mapped logical processor (LP1) at a first rate, while the LP1 is allocated to the root partition for a second rate. For example, LP1 may be allocated to the root partition 80% of the time, while LP1 may allocated to the remainder of the virtual processors 20% of the time. In an exemplary embodiment, the first rate and the second rate are based on the frequency at which the root partition is actively seeking its mapped logical processor (LP1) for carrying out I/O operations or other tasks. In other embodiments, the rates are a function of a workload that is being requested of the root partition by the virtual processors of the same virtual machine.

Although two different configurations of determining the first rate and second rate have been described, it should be understood and appreciated by those of ordinary skill in the art that other types of suitable criteria that is measured from a system may be used, and that embodiments of the present invention are not limited to the level of root-partition usage described herein.

Generally, when VP2 is scheduled to LP1, the root partition is blocked from accessing LP1, as depicted at reference numeral 530. Blocking the root partition causes a delay in executing an issued I/O operation until the time slice 520 expires, or for as long as VP2 actively running on LP1. This situations creates considerable latency in the system. By way of example, blocking the issued I/O operation will delay functions requested of the root partition, but may also stall performance of other virtual machine(s) that request and rely on the root partition to perform those functions that support the underlying operations of the virtual machine(s). By way of example, VP1 may have requested that the root partition process a network packet that is communicated to VP1, where subsequent performance at VP1 depends on processing the network packet. If the root partition is de-scheduled from LP1 at an inopportune time, such as when executing an I/O operation that relates to the network packet, the intervening virtual processor (VP2) has essentially stolen resources from both the root partition and VP1. In this case, VP1 and the root partition must wait until the root partition is rescheduled to LP1 to complete the I/O operation. Thus, regularly de-scheduling the root partition, or causing LP1 to be unavailable to the root partition, may create a bottleneck that lowers overall throughput of a system.

Referring now to FIG. 6, a schematic depiction of a scheme 600 is illustrated that demonstrates an embodiment of the present invention that may occur when a root partition is granted exclusive use of its mapped logical processor (LP1). Initially, a setting in the scheduler may be invoked to exclusively schedule the root partition to LP1. This setting may be invoke in a variety of ways. In one instance, a pattern of I/O operations performed by the root partition may be monitored over a window of time and a hardware-interrupt rate may be derived as a function of the pattern of I/O operations. As used herein, the phrase "I/O operations" is meant to be limiting, but may encompass any processes carried out by the root partition. In one instance, I/O operations relate to directly accessing network drivers, cards, or hardware (e.g., CPU, physical storage, or disk memory) in response to an I/O command from a virtual processor. In another instance, I/O operations relate to processing network packages or conducting storage transactions. Accordingly, the pattern of I/O operations is compiled upon, or inferred from, observing the physical interrupts, thread waiting time, or other intercepting instructions that result from I/O operations carried out by the root partition.

In embodiments, an I/O-awareness variable is derived from information within the pattern of I/O operations. As such, the I/O-awareness variable generally serves to indicate an amount of I/O processing currently occurring on at least one logical processor or a level of activity that the root partition is presently exhibiting. As discussed above, the I/O-awareness variable may be expressed in terms of a hardware-interrupt rate, a value of the waiting times that occur between issuing and executing a thread, or a measure of an amount of intercepting instructions being issued. Although three different formats of the I/O-awareness variable have been described, it should be understood and appreciated by those of ordinary skill in the art that other types of suitable metrics that directly or indirectly relate to a level of I/O processing may be used, and that embodiments of the present invention are not limited to those formats described herein.

In embodiments, a setting in the scheduler is established as a function of the hardware-interrupt rate, where the setting causes the scheduler to refrain from scheduling tasks issued from the virtual processors VP1 and VP2 onto the logical processor LP1. In embodiments, the hardware-interrupt rate is written to an interrupt table that is accessible by a scheduler. In operation, the interrupt table may be read in conjunction with the idle-summary table upon detecting a request from the virtual processors VP1 and VP2 to be scheduled to the plurality of logical processors LP1-LP2. Upon reading the tables and noticing that the hardware-interrupt rate has reached a high level, the scheduler may select one of the logical processors LP2-LP4, omitting LP1, for allocation to the requesting virtual processors. As discussed above, the idle-summary table is updated upon tracking the present availability of the logical processors LP1-LP4 within a node on a physical machine. By way of example, the an availability status of each of the logical processors can be tested and entered in a 64-bit format to the idle-summary table every 100 ms, where an entry of 0 indicates a busy status and an entry of 1 indicates a logical processor is available.

In an exemplary embodiment, the hardware-interrupt rate stored in the interrupt table is compared against a predetermined threshold rate (e.g., 2000 interrupts per second) and, when the hardware-interrupt rate surpasses the predetermined threshold rate, the virtual processors VP1 and VP2 are excluded from being scheduled to the logical processor LP1 mapped to the root partition. As such, the logical processor LP1 is reserved to execute I/O operations issued exclusively by the root partition. However, when the hardware-interrupt rate falls below the predetermined threshold rate, the virtual processors VP1 and VP2 are allowed to access the logical processor LP1 and cause the tasks issued by the root partition to be occasionally disrupted. Typically, the interrupt table is periodically updated to record movements or incremented changes that occur to the hardware-interrupt rate.

Returning to the exemplary scheme 660 of FIG. 6, VP2 is illustrated as being granted a time slice 605 on LP1, which is the logical processor mapped to the root partition. Next, the root partition is granted a time slice 610 on LP1 to execute an I/O operation issued by the root partition. At this point, frequency of I/O operations issued by the root partition has achieved a high level (e.g., root partition is using LP1 over 80% of the time), or has caused the hardware-interrupt rate to surpass the predetermined threshold frequency. In this situation, the scheduler assumes a setting that reserves LP1 for the root partition and blocks, as depicted at reference numeral 620, other virtual processor from being scheduled to, or accessing resources on, logical processor LP1, even when LP1 is not executing a task issued from the root partition. As such, LP1 has bandwidth (e.g., time slice 630) to execute subsequent I/O operations at any time the root partition issues those I/O operations.

Although two different configurations of invoking a setting in the scheduler to prevent VP1 and VP2 from being granted access to LP1 have been described, it should be understood and appreciated by those of ordinary skill in the art that other types of suitable triggers for reducing virtual-machine usage of the mapped logical processor may be used, and that embodiments of the present invention are not limited to the predetermined threshold rate or high level of frequency described herein. For instance, arresting allocation of the logical processor LP1 to the virtual processors VP1 and VP2 may involve scheduling the virtual processors VP1 and/or VP2 to the logical processor LP1 at a rate that is inversely proportional to the hardware-interrupt rate.

In yet other embodiments, the techniques described above may be applied to non-uniform memory access (NUMA) topology to improve overall system performance. For instance, a logical processor may be typically mapped to a root partition that resides in the same node as the mapped logical processor. As such, the scheduler may identify this local logical processor as the ideal logical processor when ascertaining which logical processor to designate to the root partition during heavy hardware interrupts (e.g., I/O intensive at the time of the scheduler evaluation). In contrast, a logical processor that is located in another node, which is remote from the root partition, may be designated and stored by the scheduler as a non-ideal logical processor.

Figure 7:
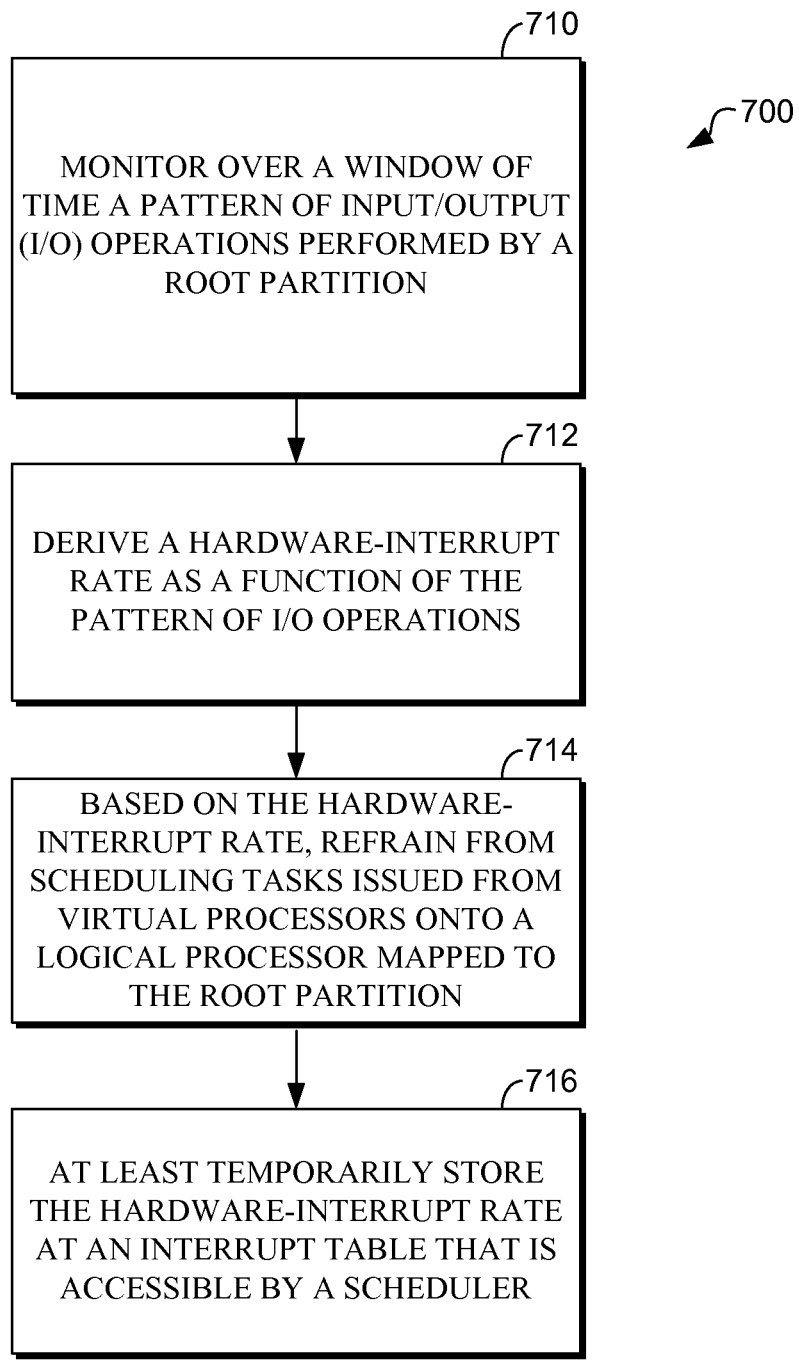
FIG. 7 is a flow diagram showing a method for excluding one or more virtual processors from being scheduled to a logical processor, in accordance with an embodiment of the present invention.

Turning now to FIG. 7, a flow diagram illustrating a method 700 for excluding one or more virtual processors from being scheduled to a logical processor is shown, in accordance with an embodiment of the present invention. The method 700 includes the step of monitoring over a window of time a pattern the I/O operations performed by a root partition, as depicted at block 710. Typically, the root partition is mapped to the logical processor, which is designated to carry out I/O operations issued by the root partition. The method may further include the steps of deriving a hardware-interrupt rate as a function of the pattern of I/O operations (see block 712) and, based on the hardware-interrupt rate, refraining from scheduling tasks issued from the virtual processors onto the logical processor (see block 714). As depicted at block 716, the hardware-interrupt rate at may be written to, or temporarily stored at, an interrupt table that is accessible by a scheduler. This interrupt table may be periodically reviewed by the scheduler to determine if the mapped logical processor is available for being allocated to virtual processors.

Figure 8:
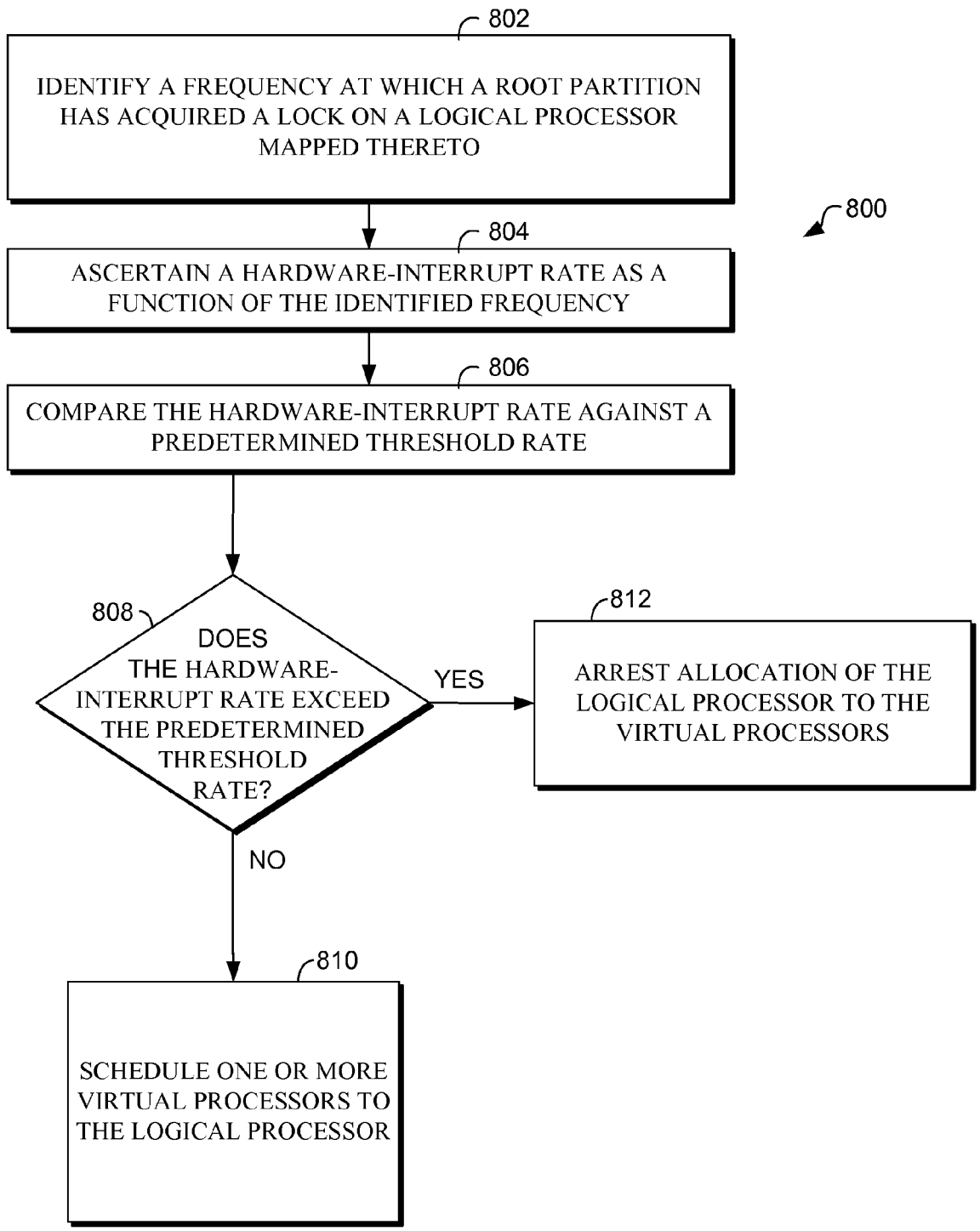
FIG. 8 is a flow diagram showing a method for arresting allocation of a logical processor to one or more virtual processors, in accordance with an embodiment of the present invention.

With reference to FIG. 8, a flow diagram showing a method 800 for arresting allocation of a logical processor to one or more virtual processors is shown, in accordance with an embodiment of the present invention. The method 800 includes the step of identifying a frequency at which a root partition has acquired a lock on the logical processor. Typically, the logical processor is one of a plurality of logical processors that are carved out of a physical machine to execute threads issued by the virtual processors, as depicted at block 802. In operation, the logical processor is configured to execute I/O operations issued by the root partition upon acquiring the lock.

The method 800 further includes ascertaining a hardware-interrupt rate as a function of the identified frequency (see block 804) and comparing the hardware-interrupt rate against a predetermined threshold rate (see block 806). As depicted at block 808, a determination is made, based on the comparison, of whether the hardware-interrupt rate surpasses the predetermined threshold rate. When the hardware-interrupt rate surpasses the predetermined threshold rate, as depicted at block 812, the allocation of the logical processor to the virtual processors is arrested. However, when the hardware-interrupt rate resides below the predetermined threshold rate, as depicted at block 810, the virtual processors may be scheduled to the logical processor.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage memory hardware devices having computer-executable instructions embodied thereon that, when executed, perform a method for controlling an allocation rate of a logical processor to a root partition and to one or more virtual processors, wherein the logical processor is one of a plurality of logical processors that are partitioned on a physical machine to execute threads issued by the one or more virtual processors, the method comprising:
  monitoring over a window of time a pattern of input/output (I/O) operations performed by the root partition, wherein the logical processor is mapped to the root partition such that the root partition is exclusively scheduled on the logical processor;
  periodically updating a hardware interrupt rate stored in an interrupt table accessible by a scheduler during the window of time, wherein the hardware-interrupt rate is derived as a function of the pattern of I/O operations; and
  scheduling, by the scheduler, the one or more virtual processors to the plurality of logical processors, the scheduling comprising allocating the logical processor to execute threads, issued by the one or more virtual processors at a first rate and to execute the I/O operations, issued by the root partition, at a second rate, wherein the first rate is less than the second rate, inversely proportional to a hardware-interrupt rate stored in the interrupt table, greater than zero, and excluding the one or more virtual processors from being allocated to the logical processor at a rate greater than the first rate.

2. The memory devices of claim 1, wherein excluding the one or more virtual processors from being scheduled to the logical processor comprises reserving the logical processor to execute I/O operations issued exclusively by the root partition that is mapped to the logical processor.

3. The memory devices of claim 2, wherein the method further comprises:
  when the hardware-interrupt rate falls below the predetermined threshold rate, allowing the one or more virtual processors to access the logical processor; and
  updating the interrupt table in accordance with incremented changes that occur to the hardware-interrupt rate.

4. The memory devices of claim 3, wherein allowing the one or more virtual processors to access the logical processor comprises granting the one or more virtual processors at least one time slice that allocates the logical processor to the one or more virtual processors for a predetermined duration of time.

5. The memory devices of claim 3, the method further comprising de-scheduling the root partition from the logical processor as a function of the hardware-interrupt rate.

6. The memory devices of claim 1, wherein monitoring a pattern of I/O operations performed by a root partition comprises periodically inspecting the logical processor to determine whether the root partition has acquired a lock on the logical processor.

7. The memory devices of claim 1, wherein the pattern of I/O operations performed by a root partition comprises satisfying a request from the one or more virtual machines to process a network packet or carrying out a storage transaction.

8. The memory devices of claim 1, the method further comprising:
  tracking in an idle-summary table a present availability of a plurality of logical processors within a node on a physical machine, wherein the plurality of logical processors includes the logical processor mapped to the root partition;

reading the idle-summary table in conjunction with the interrupt table upon detecting a request from the one or more virtual processors to be scheduled to the plurality of logical processors; and selecting one of the plurality of logical processors for allocation to the one or more requesting virtual processors based upon the idle-summary table in conjunction with the interrupt table.

9. A computer system for controlling an allocation rate of a logical processor to a root partition and to one or more virtual processors wherein the logical processor is one of a plurality of logical processors that are partitioned on a physical machine to execute threads issued by the one or more virtual processors, disallowing a plurality of virtual processors from being scheduled to a particular logical processor as a function of usage thereof, the computer system comprising:

a first node residing on the physical machine, wherein the first node is associated with the plurality of logical processors, a scheduler running on the physical machine configured for:

monitoring over a window of time a pattern of input/output (I/O) operations performed by the root partition, wherein the logical processor is mapped to the root partition such that the root partition is exclusively scheduled on the logical processor;

periodically updating a hardware-interrupt rate derived as a function of the pattern of I/O operations, wherein the hardware-interrupt rate for the window of time is written to an interrupt table that is accessible by the scheduler; and scheduling, by the scheduler, the one or more virtual processors to the plurality of logical processors, the scheduling comprising allocating the logical processor to execute threads, issued by the one or more virtual processors, at a first rate and to execute the I/O operations, issued by the root partition, at a second rate, wherein the first rate is less than the second rate, inversely proportional to the hardware-interrupt rate stored in the interrupt table, greater than zero; and excluding the one or more virtual processors from being allocated to the logical processor at a rate greater than the first rate.

10. The computer system of claim 9, wherein a first portion of the plurality of virtual processors comprises a first virtual machine, and wherein the root partition issues the I/O operations to provide the first virtual machine with access to network packets and hardware memory.

11. The computer system of claim 9, further comprising a second node residing on the physical machine, wherein the second node is associated with a plurality of logical processors that are segregated from the plurality of logical processors associated with the first node, and wherein one of the plurality of logical processors associated with the second node is mapped to the root partition.

12. The computer system of claim 11, wherein a second portion of the plurality of virtual processors comprises a second virtual machine, and wherein the root partition issues the I/O operations to provide the second virtual machine with access to network packets and hardware memory, wherein the root partition resides in the first node as the mapped logical processor such that logical processor is designated by a scheduler as a first option logical processor over the plurality of logical processor associated with the second node mapped to the root partition.

13. A computerized method for controlling an allocation rate of a logical processor to a root partition and to one or more virtual processors the logical processor is one of a plurality of logical processors that are partitioned on a physical machine to execute threads issued by the one or more virtual processors, the method comprising:

monitoring over a window of time a pattern of input/output (I/O) operations issued by the root partition, wherein the logical processor is mapped to the root partition such that the root partition is exclusively scheduled on the logical processor;

periodically updating a hardware interrupt rate stored in an interrupt table accessible by a scheduler during the window of time, wherein the hardware-interrupt rate is derived as a function of the pattern of I/O operations; and scheduling, by the scheduler, the one or more virtual processors to the plurality of logical processors, the scheduling comprising allocating the logical processor to execute threads issued by the one or more virtual processors at a first rate and to execute the I/O operations issued by the root partition at a second rate, wherein the first rate is less than the second rate, inversely proportional to the hardware-interrupt rate stored in the interrupt table, greater than zero, and excluding the one or more virtual processors from being allocated to the logical processor at a rate greater than the first rate.

14. The computerized method of claim 13, wherein excluding allocation of the one or more virtual processors to the logical comprises refraining from granting the one or more virtual processors a time slice on the logical processor when the logical processor is available and others of the one or more logical processors are unavailable.

15. The computerized method of claim 13, wherein monitoring a pattern of I/O operations performed by a root partition comprises periodically inspecting the logical processor to determine whether the root partition has acquired a lock on the logical processor.

16. The computerized method of claim 13, wherein the pattern of I/O operations performed by a root partition comprises satisfying a request from the one or more virtual machines to process a network packet or carrying out a storage transaction.

17. The computerized method of claim 16, the method further comprising:

tracking in an idle-summary table a present availability of a plurality of logical processors within a node on a physical machine, wherein the plurality of logical processors includes the logical processor mapped to the root partition;

reading the idle-summary table in conjunction with the interrupt table upon detecting a request from the one or more virtual processors to be scheduled to the plurality of logical processors; and selecting one of the plurality of logical processors for allocation to the one or more requesting virtual processors based upon the idle-summary table in conjunction with the interrupt table.

* * * * *